United States Patent

Gill et al.

Patent Number: 5,374,866
Date of Patent: Dec. 20, 1994

[54] ACTIVE COOLING SYSTEM FOR GENERATOR TERMINAL BOX

[75] Inventors: Ranjit S. Gill; Alexander J. Smolenski, both of Schenectady, N.Y.

[73] Assignee: General Electric Co., Schenectady, N.Y.

[21] Appl. No.: 94,269

[22] Filed: Jul. 21, 1993

[51] Int. Cl.⁵ .................. H02K 11/00; H02K 9/08; H02K 9/00
[52] U.S. Cl. .................................. 310/59; 310/71
[58] Field of Search ................ 310/52, 55, 58, 59, 310/71; 361/688, 690, 691, 694, 695; 174/15.1, 16.1, 17 GF

[56] References Cited

U.S. PATENT DOCUMENTS

| | | | |
|---|---|---|---|
| 2,742,582 | 4/1956 | Bahn et al. | 310/52 |
| 3,505,546 | 4/1970 | Victor et al. | 310/55 |
| 3,808,489 | 4/1974 | Albright et al. | 310/52 |
| 3,903,441 | 9/1975 | Towne | 310/71 |
| 4,121,126 | 10/1978 | Armor et al. | 310/59 |
| 4,317,952 | 3/1982 | Armor et al. | 310/54 |
| 4,837,469 | 6/1989 | Ward | 310/54 |
| 4,866,316 | 9/1989 | Humphries et al. | 310/71 |

Primary Examiner—Steven L. Stephan
Assistant Examiner—Clayton E. LaBalle
Attorney, Agent, or Firm—Nixon & Vanderhye

[57] ABSTRACT

Disclosed is an active cooling system for a terminal box associated with a gas cooled electric powered generator. A manifold system is provided around the periphery of the terminal box and is fluidly connected to the inlet of the power generator cooling fan. A plurality of holes spaced around the manifold system permit a lower pressure at the fan inlet to draw cooling gas through the generator along the walls and floor of the terminal box and into the manifold. This increased cooling prevents temperature damage to the terminal box, and its walls and floor and components located therein and reduces terminal box burn hazard.

8 Claims, 4 Drawing Sheets

ACTIVE COOLING SYSTEM FOR GENERATOR TERMINAL BOX

TECHNICAL FIELD

The present invention relates generally to the cooling of electrical power generators and in particular relates to the cooling of terminal boxes of gas cooled generators which include water cooled conductor bushings.

BACKGROUND

Commercial electric power generators provide electric power which is subsequently transformed into a high voltage/lower current power for transmission for substantial distances over conventional power distribution lines. The output from the generator is generally routed through a terminal box in which a relatively large copper core carries the output current to the step-up transformer which increases the voltage and lowers the current for low loss transmission. Although the cables leaving the generator through the terminal box are quite large (as much as a six inch diameter solid copper cable) and their resistance is low, due to the extremely high current levels carried by the cable, a substantial amount of heat is generated.

In the past, generators have been cooled by hydrogen gas and this gas was passed through the bushings (where the conductor passes through the terminal box) to cool the bushing. At conventional commercial power generation levels, this was sufficient to prevent temperature extremes in the terminal box. However, with the advent of extremely high power generation systems, it has been necessary to obtain even greater heat transfer in the area of bushings which has been achieved by going to water cooled bushings. While water cooled bushings serve to maintain the temperature of the bushing at a relatively low level, due to the extremely high current levels and varying magnetic fields generated by those currents, proximity heating (eddy current heating) of the floor and walls of the terminal box result in undesirable temperatures in the terminal box, The water cooling of the bushings is not sufficient to remove sufficient heat so as to keep the floor and walls of the terminal box at appropriate temperatures.

DISCLOSURE OF THE INVENTION

It is an object of the present invention to prevent undesirably high temperatures in the terminal box of a commercial power generator.

It is a further object of the present invention to reduce the temperature in the floor and walls of a terminal box associated with a commercial power generation system where the terminal bushings are water cooled.

It is a still further object of the present invention to provide a method for cooling the floor and walls of a terminal box in a commercial power generation system.

The above and other objects are achieved in accordance with the present invention by providing a manifold at the corner junction between the floor and walls of the terminal box. The manifold is connected to the low pressure side of the generator cooling fan which in turn circulates coolant gas throughout the generator. The low pressure in the manifold is distributed to the terminal box by a plurality of spaced apart holes in the manifold. The low pressure at the holes draws cooling gas from the generator into and through the terminal box providing an overall temperature reduction. The proximity of the holes in relationship to the walls and floor of the terminal box aids in a flow of cooling gas along the walls and floor thereby reducing operating temperatures of the terminal box.

BRIEF DESCRIPTION OF THE DRAWINGS

The invention will be better understood by reference of the following drawings wherein:

FIG. 2A is a detailed view of a portion of FIG. 2;

BEST MODE FOR CARRYING OUT THE INVENTION

Figure 4:
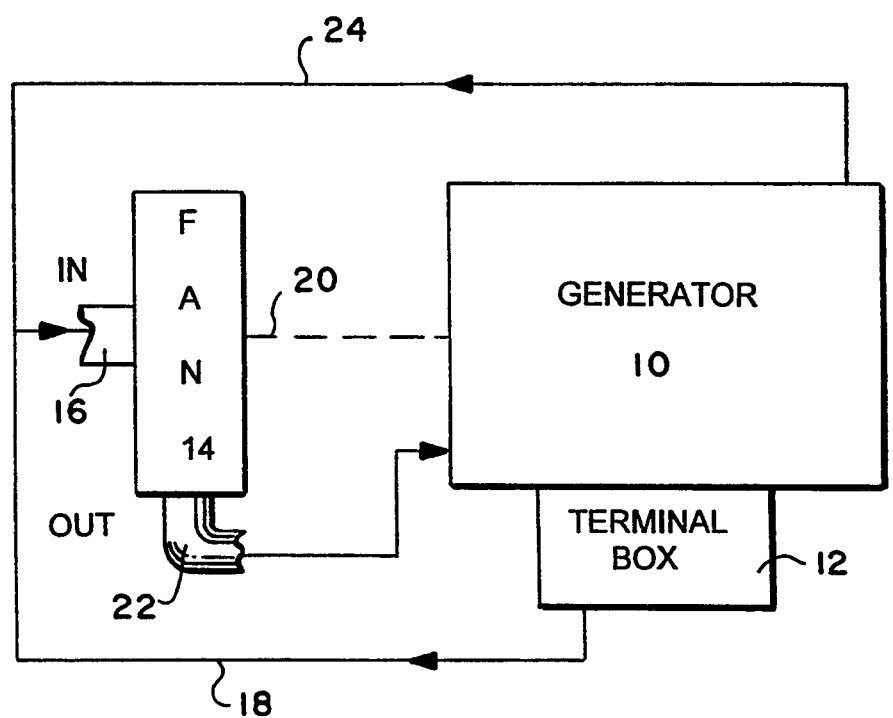
FIG. 4 is a block diagram illustrative of the operation of the present invention.

Similar elements are similarly designated by reference numerals in the individual drawings. For an overall understanding of applicants' invention, attention is first directed to FIG. 4 in which the relationship between generator 10 and terminal box 12 is illustrated. The terminal box, also known as a lower frame extension or LFE, is attached to and generally part of the lower portion of an electrical generator housing.

Figure 3:
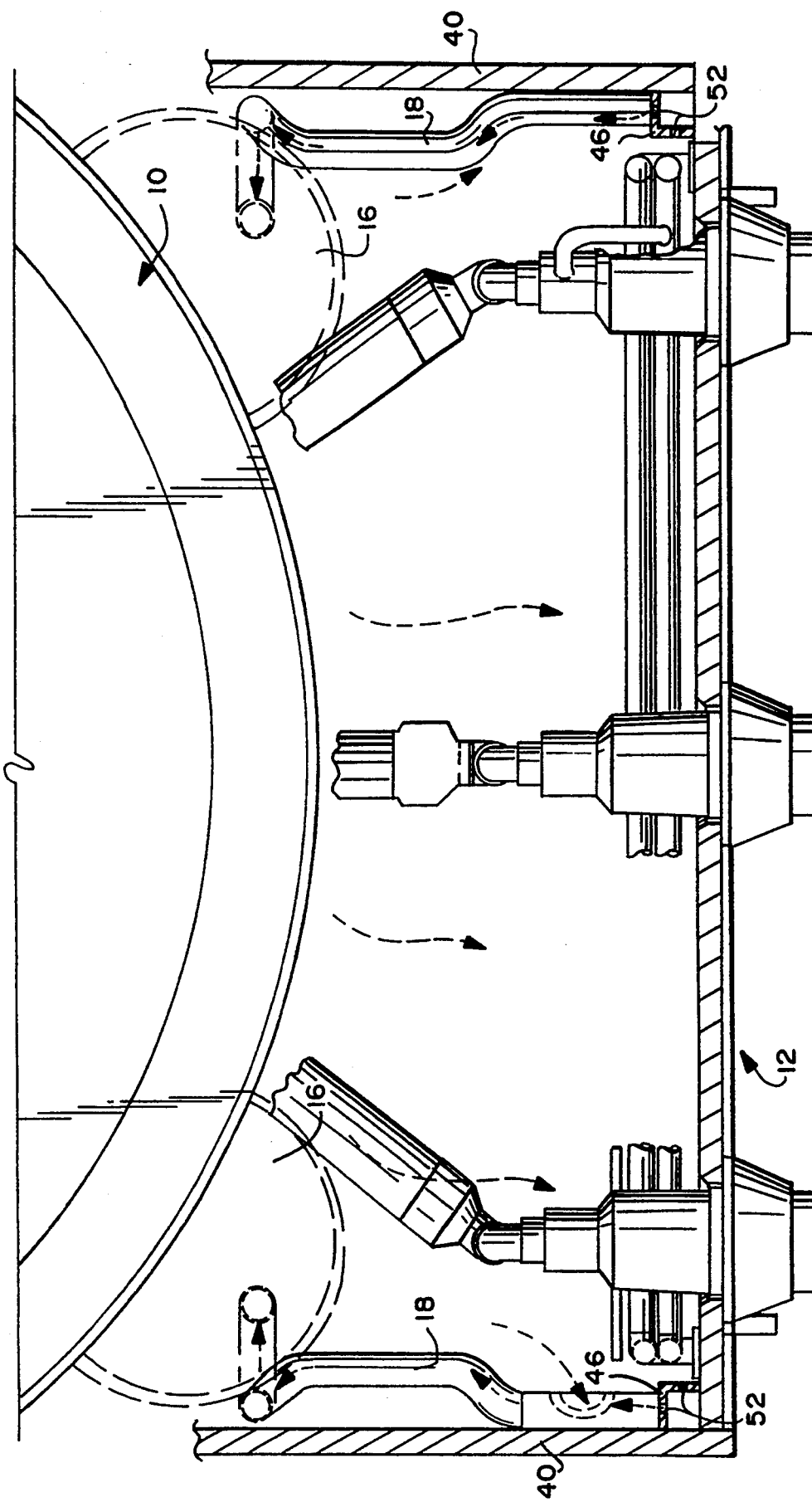
FIG. 3 is an end view partially in section of the terminal box and generator assembly in accordance with the present invention.

Conventionally, there is fluid communication between the internal area of the terminal box and the generator. This can be seen also in FIG. 3 where, in accordance with the present invention, there is a gas flow from the generator 10 into the terminal box 12. In order to promote this flow, applicants' invention provides a low pressure distribution manifold in the terminal box 12 which is connected to the generator fan 14 at its inlet 16 by means of conduit 18.

Although the fan 14 is shown separately with a mechanical connection 20 to the generator, the fan is generally an integral part of the generator housing and the exit from the fan 14 and the fan outlet 22 is directed towards various areas of the generator which have relatively high temperatures. Existing return path 24 is also shown which is known in the prior art which provides a return path to the inlet 16 of fan 14. As will be seen, the addition of the active cooling of the present invention to the terminal box merely requires a manifold and a connection to this return path.

Figure 1:
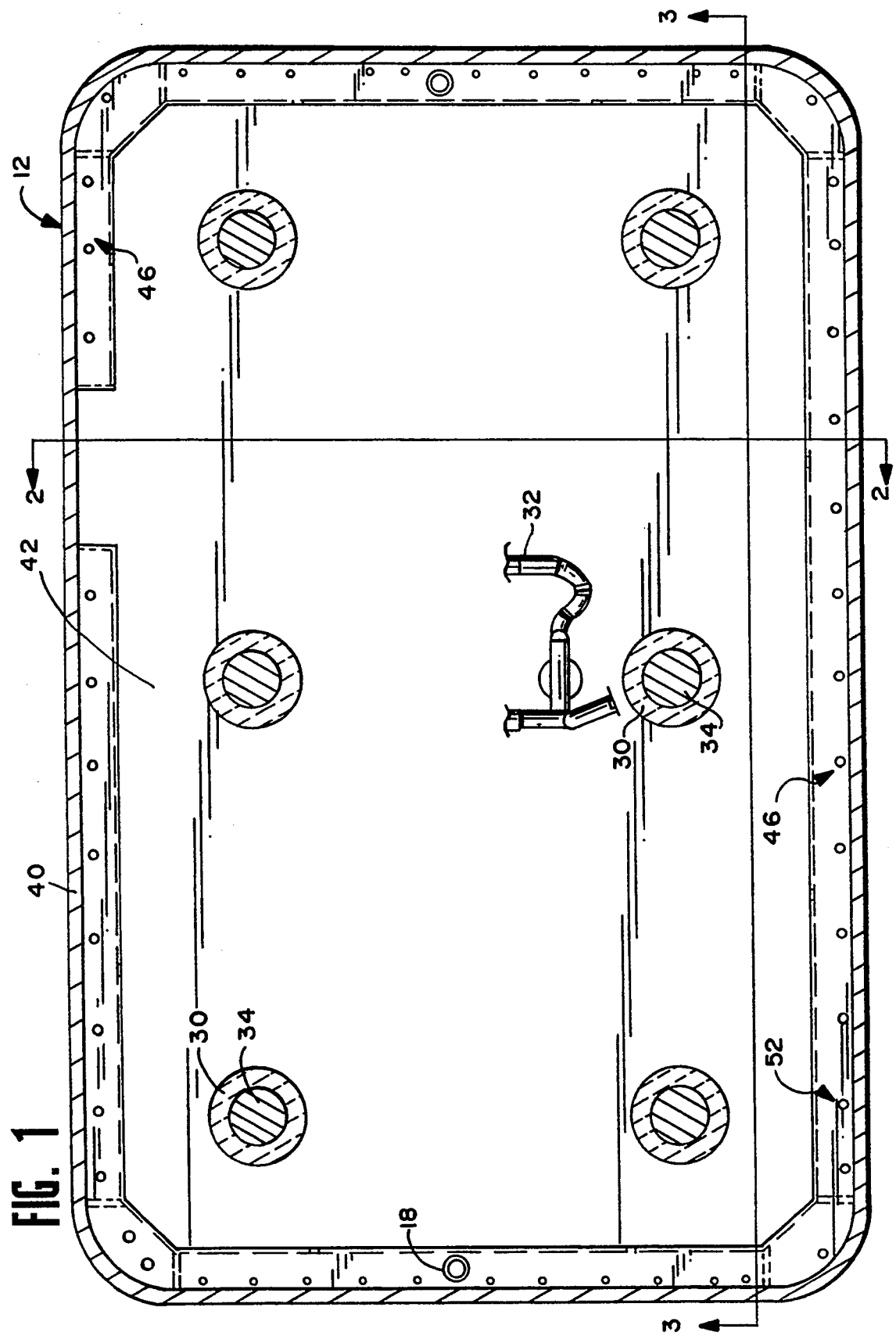
FIG. 1 is a top view partially in section of a terminal box including the present invention.

Attention is now directed to FIG. 1 which is a top view of a terminal box 12 equipped with the present invention. Porcelain insulators or bushings 30 are provided with cooling water through a conventional water distribution system 32. The copper conductors 34 carry the generated power from the generator through the terminal box and there respective bushings are connected to an external transmission system generally a voltage step-up transformer (not shown). These copper conductors may be as much as six inches in diameter and comprised of solid copper metal. They carry as much as 32,000 amps at 27,000 volts. The terminal box itself is comprised of a series of four common steel walls 40 and a stainless steel floor 42.

In a preferred embodiment, the corner between adjacent walls is a rounded section. Also, while a four-wall terminal box is shown, any number of walls or geometric combination of walls could be used. While floor 42 is shown as a single planar substrate, various combination of planes and angles could be used in the floor depending upon the particular needs of the terminal box and its associated electrical power generator.

Figure 2:
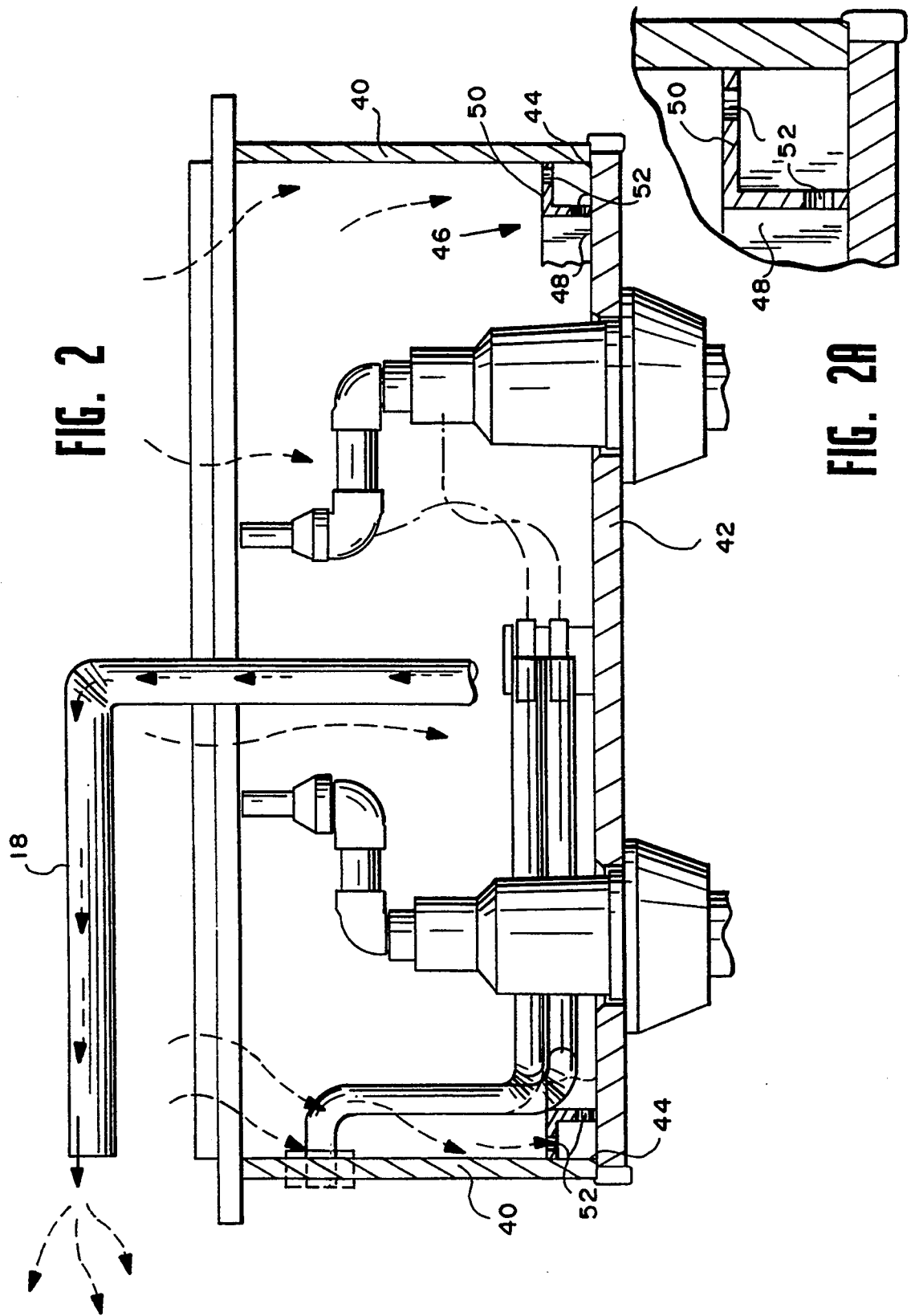
FIG. 2 is a side view partially in section of the terminal box of FIG. 1

The intersection 44 between walls 40 and floor 42 is seen more clearly in FIG. 2. The present invention comprises the provision of a manifold system 46 around the periphery of the floor at the intersection 44. While the manifold could be located solely on the floor or solely on the walls or combinations of the two, in a preferred embodiment it is located in conjunction with the intersection 44 between walls 40 and floor 42.

In the preferred configuration, the manifold 46 can be comprised of a section of angled stainless steel plate material having two planar extending portions 48 and 50 as more clearly seen in FIG. 2A. In a preferred embodiment, extending portion 48 is located parallel to wall 40 and extending portion 50 is parallel to floor 42. Where the extending portions contact their respective walls and floor, they are sealingly welded or otherwise connected thereto so as to form a gas manifold duct.

In a preferred embodiment, the terminal box is constructed of type 304 stainless steel sheet for the floor with common steel walls, and the plate material extending portions are ¼ inch thick stainless steel sheet angled at the extending portions at a right angle with respect to each other, where each extending portion is 4 inches long. The terminal box is approximately 9.3 feet by 6.3 feet and the conduit 18 is a three inch diameter conduit. The pressure differential between the inside of the terminal box and the fan inlet is 25–30 inches of $H_2O$ (preferably 27 inches) or approximately one pounds per square inch gauge (PSIG). Hydrogen gas in a preferred embodiment is used as the coolant because of its greater heat transfer capability and its lower hydrodynamic friction in the generator.

Holes 52 are provided in both extending portions 48 and 50 so as to provide an aperture permitting cooling gas to flow into the manifold when the pressure in the manifold is less than the pressure of the cooling gas in the terminal box. In a preferred embodiment, the holes are distributed along the manifold as indicated in FIG. 1. The holes along the 9.3 foot side are 1 inch in diameter and are centered 1 inch away from the walls (in the case of holes in extending portion 50) or floor (in the case of holes in extending portion 48). The holes along the 6.3 foot ends are ½ inch in diameter and centered ¾ inch from the respective walls or floor. This distribution and sizing promotes an even flow of hydrogen cooling gas over the disclosed terminal box.

In a preferred embodiment, at each end of the terminal box, the manifold is connected to a conduit 18 which in turn is connected to the fan inlet 16. Thus, the manifold is effectively placed at a gas pressure lower than the gas pressure present in the generator housing and the terminal box itself. This lower pressure induces a flow of cooling gas from the generator through the terminal box to the manifold.

The position of holes 52, in a preferred embodiment, adjacent the intersection of the angled plate and a respective wall or floor, serves to encourage flow along the respective walls and floor of the terminal box. For example, holes in extending portion 48 encourage the flow of gas along floor 42 into the manifold system 46. Holes in the extending portion 50 encourage the flow of gas along walls 40 and into the manifold system 46.

In accordance with the above, the provision of a distributed low pressure manifold around the periphery of the terminal box promotes the flow of cooling gas along the walls and floor cooling the structure to overcome the temperature effects caused by the higher output modern electrical power generation systems (which is also why water cooling of the bushings are necessary).

In view of the above, numerous changes, modification and improvements to the present invention will be readily apparent to those of ordinary skill in the art. For example, a single plate could be welded a 45° angle to both the floor and wall and define a manifold system as well. Such a system would not tend to encourage cooling gas flow along the floors and walls to the extent of the disclosed system, but would still provide a significant improvement in gas cooling flow through the terminal box. Different materials and geometric configurations could be used without departing from the scope of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An active cooling system for a terminal box in a gas cooled generator having liquid cooled bushings, said terminal box subject to proximity heating, where said generator is supplied with a cooling gas at a gas pressure and said terminal box includes a floor and walls and is fluidly connected to said generator, said cooling system comprising:

suction means for providing a source of pressure less than said gas pressure; and manifold means, fluidly connected to said suction means and at least partially located in said terminal box, for providing an exit path for cooling gas flowing into said terminal box from said generator, said manifold means, said suction means and said fluid connection between said generator and said terminal box, together comprising a means for cooling at least one of the floor and walls of said terminal box with said cooling gas before said cooling gas reaches said manifold, wherein said terminal box has one floor and a plurality of walls, each of said walls intersecting said floor at an intersection, said intersection extending around the periphery of said floor, said manifold at least partially covering said intersection.

2. The active cooling system according to claim 1, wherein said manifold is comprised of a plate material coupled to said wall and floor near said intersection, said wall, said floor and said plate material in combination defining said manifold.

3. The active cooling system according to claim 2, wherein said plate material includes a plurality of holes.

4. The active cooling system according to claim 3, wherein said plate material comprises an angle shaped cross section comprised of two planar extending portions interconnected at a right angle, one of said two planar sections sealingly connected to said wall and the other of said planar sections sealingly connected to said floor.

5. The active cooling system according to claim 4, wherein said plurality of holes comprises holes in at least one of said planar sections, said holes in combination with said at least one of said planar sections comprising a means for encouraging gas flow along said wall and floor sealingly connected to said planar section.

6. The active cooling system according to claim 5, wherein said plurality of holes comprises holes in both of said planar sections, said holes in combination with both of said planar sections comprising a means for encouraging gas flow along both said walls and floor.

7. In an electrical generator including at least one hydrogen gas cooled stator and armature, where electrical power is provided through at least one water cooled bushing located in a terminal box, said terminal box subject to proximity heating, where said generator includes a fan for circulating hydrogen gas through said generator, said fan having an inlet and an outlet, said outlet for providing hydrogen gas at a pressure greater than a hydrogen gas pressure at said inlet, and said terminal box includes a floor and walls and is fluidly connected to said generator, the improvement comprising an active cooling system for said terminal box, said cooling system comprising a manifold means, fluidly connected to said inlet and at least partially located around a periphery of said terminal box, for withdrawing cooling gas from said terminal box, said manifold means and said fluid connection between said generator and said terminal box, together, comprising a means for cooling at least one of the floor and walls of said terminal box with said cooling gas before said cooling gas reaches said manifold.

8. A method of actively cooling a terminal box which is subject to proximity heating in a gas cooled generator, where said generator includes a liquid cooled bushing and a fan which supplies a cooling gas to the generator at a gas pressure and said terminal box includes a floor and walls and is fluidly connected to said generator, said method comprising the steps of:

providing a source of pressure less than said gas pressure at an inlet to said fan;

providing a manifold around the periphery of the floor of said terminal box, fluidly connected to said source of pressure less than said gas pressure; and withdrawing said cooling gas from said terminal box along as least one of said floor and walls of said terminal box through said manifold, thereby causing cooling gas to flow into said terminal box from said generator and cooling at least one of said walls and floor of said terminal box before reaching said manifold.

* * * * *